(12) United States Patent
Taherzadeh Boroujeni et al.

(10) Patent No.: US 11,405,156 B2
(45) Date of Patent: Aug. 2, 2022

(54) TECHNIQUES FOR TRACKING REFERENCE SIGNAL WITH CONCENTRATED POWER PER TONE

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 16/949,408

(22) Filed: Oct. 28, 2020

(65) Prior Publication Data

US 2022/0131667 A1   Apr. 28, 2022

(51) Int. Cl.
*H04W 4/00* (2018.01)
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC ............................ H04L 5/0048; H04W 72/042
USPC ....................................................... 370/329
See application file for complete search history.

(56) References Cited

U.S. PATENT DOCUMENTS

| 11,190,261 | B2* | 11/2021 | Da Silva | H04B 7/0626 |
| 2016/0269160 | A1* | 9/2016 | Noh | H04B 7/0417 |
| 2021/0058971 | A1* | 2/2021 | MolavianJazi | H04B 17/318 |

FOREIGN PATENT DOCUMENTS

| EP | 3591870 A2 | 1/2020 |
| WO | WO-2019195171 A1 | 10/2019 |
| WO | WO-2020022948 A1 | 1/2020 |
| WO | WO-2020058743 A1 | 3/2020 |

OTHER PUBLICATIONS

International Search Report and Written Opinion—PCT/US2021/071665—ISA/EPO—dated Jan. 27, 2022.

\* cited by examiner

*Primary Examiner* — Maharishi V Khirodhar
(74) *Attorney, Agent, or Firm* — Dalei Dong

(57) ABSTRACT

Various aspects of the present disclosure generally relate to wireless communication. In some aspects, a user equipment (UE) may receive, based at least in part on one or more coverage enhancement requirements associated with the UE, a tracking reference signal (TRS) indication that indicates a set of resources corresponding to a TRS. The UE may receive the TRS, wherein the TRS includes a plurality of tones, wherein a transmission power for each tone of the plurality of tones is inversely proportional to a bandwidth difference between a bandwidth of the TRS and a reference bandwidth associated with the TRS. Numerous other aspects are provided.

30 Claims, 7 Drawing Sheets

TECHNIQUES FOR TRACKING REFERENCE SIGNAL WITH CONCENTRATED POWER PER TONE

FIELD OF THE DISCLOSURE

Aspects of the present disclosure generally relate to wireless communication and to techniques and apparatuses for tracking reference signals with concentrated power per tone.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, based at least in part on one or more coverage enhancement requirements associated with the UE, a tracking reference signal (TRS) indication that indicates a set of resources corresponding to a TRS; and receiving the TRS, wherein the TRS includes a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific downlink control information (DCI) transmission, a group-common DCI transmission, a UE-specific medium access control (MAC)-control element (MAC-CE), or a group-common MAC-CE.

In some aspects, the TRS indication activates a configured TRS.

In some aspects, the configured TRS comprises one or more parameters corresponding to the TRS.

In some aspects, the method includes receiving an additional TRS indication, wherein the additional TRS indication comprises a dynamic indication of an additional set of resources associated with the TRS.

In some aspects, the additional TRS indication indicates an additional bandwidth corresponding to the additional set of resources.

In some aspects, the method includes receiving an indication of an expiry timer corresponding to the TRS.

In some aspects, the TRS indication indicates the expiry timer corresponding to the TRS.

In some aspects, the method includes receiving an additional TRS, wherein the additional TRS comprises the reference bandwidth based at least in part on a determination that the expiry timer is expired.

In some aspects, the indication of the expiry timer comprises a dynamic indication.

In some aspects, a method of wireless communication performed by a base station includes transmitting, based at least in part on one or more coverage enhancement requirements associated with a UE, a TRS indication that indicates a set of resources corresponding to a TRS; and transmitting the TRS, the TRS comprising a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the method includes transmitting an additional TRS indication, wherein the additional TRS indication comprises a dynamic indication of an additional set of resources associated with the TRS.

In some aspects, the additional TRS indication indicates an additional bandwidth corresponding to the additional set of resources.

In some aspects, the method includes transmitting an indication of an expiry timer corresponding to the TRS.

In some aspects, the TRS indication indicates the expiry timer corresponding to the TRS.

In some aspects, the method includes transmitting an additional TRS, wherein the additional TRS comprises the reference bandwidth based at least in part on a determination that the expiry timer is expired.

In some aspects, the indication of the expiry timer comprises a dynamic indication.

In some aspects, a UE for wireless communication includes a memory; and one or more processors operatively coupled to the memory, the memory and the one or more processors configured to: receive, based at least in part on one or more coverage enhancement requirements associated with the UE, a TRS indication that indicates a set of resources corresponding to a TRS; and receive the TRS, wherein the TRS includes a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the one or more processors are further configured to receive an additional TRS indication, the additional TRS indication comprises a dynamic indication of an additional set of resources associated with the TRS.

In some aspects, the additional TRS indication indicates an additional bandwidth corresponding to the additional set of resources.

In some aspects, the one or more processors are further configured to receive an indication of an expiry timer corresponding to the TRS.

In some aspects, the TRS indication indicates the expiry timer corresponding to the TRS.

In some aspects, the one or more processors are further configured to receive an additional TRS, the additional TRS comprises the reference bandwidth based at least in part on a determination that the expiry timer is expired.

In some aspects, the indication of the expiry timer comprises a dynamic indication.

In some aspects, a base station for wireless communication includes a memory; and one or more processors operatively coupled to the memory, the memory and the one or more processors configured to: transmit, based at least in part on one or more coverage enhancement requirements associated with a UE, a TRS indication that indicates a set of resources corresponding to a TRS; and transmit the TRS, the TRS comprising a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the one or more processors are further configured to transmit an additional TRS indication, the additional TRS indication comprises a dynamic indication of an additional set of resources associated with the TRS.

In some aspects, the additional TRS indication indicates an additional bandwidth corresponding to the additional set of resources.

In some aspects, the one or more processors are further configured to transmit an indication of an expiry timer corresponding to the TRS.

In some aspects, the TRS indication indicates the expiry timer corresponding to the TRS.

In some aspects, the one or more processors are further configured to transmit an additional TRS, the additional TRS comprises the reference bandwidth based at least in part on a determination that the expiry timer is expired.

In some aspects, the indication of the expiry timer comprises a dynamic indication.

In some aspects, a non-transitory computer-readable medium storing a set of instructions for wireless communication includes one or more instructions that, when executed by one or more processors of a UE, cause the UE to: receive, based at least in part on one or more coverage enhancement requirements associated with the UE, a TRS indication that indicates a set of resources corresponding to a TRS; and receive the TRS, wherein the TRS includes a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the one or more instructions further cause the UE to receive an additional TRS indication, the additional TRS indication comprises a dynamic indication of an additional set of resources associated with the TRS.

In some aspects, the additional TRS indication indicates an additional bandwidth corresponding to the additional set of resources.

In some aspects, the one or more instructions further cause the UE to receive an indication of an expiry timer corresponding to the TRS.

In some aspects, the TRS indication indicates the expiry timer corresponding to the TRS.

In some aspects, the one or more instructions further cause the UE to receive an additional TRS, the additional TRS comprises the reference bandwidth based at least in part on a determination that the expiry timer is expired.

In some aspects, the indication of the expiry timer comprises a dynamic indication.

In some aspects, a non-transitory computer-readable medium storing a set of instructions for wireless communication includes one or more instructions that, when executed by one or more processors of a base station, cause the base station to: transmit, based at least in part on one or more coverage enhancement requirements associated with a UE, a TRS indication that indicates a set of resources corresponding to a TRS; and transmit the TRS, the TRS comprising a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the one or more instructions further cause the base station to transmit an additional TRS indication, the additional TRS indication comprises a dynamic indication of an additional set of resources associated with the TRS.

In some aspects, the additional TRS indication indicates an additional bandwidth corresponding to the additional set of resources.

In some aspects, the one or more instructions further cause the base station to transmit an indication of an expiry timer corresponding to the TRS.

In some aspects, the TRS indication indicates the expiry timer corresponding to the TRS.

In some aspects, the one or more instructions further cause the base station to transmit an additional TRS, the additional TRS comprises the reference bandwidth based at least in part on a determination that the expiry timer is expired.

In some aspects, the indication of the expiry timer comprises a dynamic indication.

In some aspects, an apparatus for wireless communication includes means for receiving, based at least in part on one or more coverage enhancement requirements associated with the apparatus, a TRS indication that indicates a set of resources corresponding to a TRS; and means for receiving the TRS, wherein the TRS includes a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the apparatus.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the apparatus includes means for receiving an additional TRS indication, wherein the additional TRS indication comprises a dynamic indication of an additional set of resources associated with the TRS.

In some aspects, the additional TRS indication indicates an additional bandwidth corresponding to the additional set of resources.

In some aspects, the apparatus includes means for receiving an indication of an expiry timer corresponding to the TRS.

In some aspects, the TRS indication indicates the expiry timer corresponding to the TRS.

In some aspects, the apparatus includes means for receiving an additional TRS, wherein the additional TRS comprises the reference bandwidth based at least in part on a determination that the expiry timer is expired.

In some aspects, the indication of the expiry timer comprises a dynamic indication.

In some aspects, an apparatus for wireless communication includes means for transmitting, based at least in part on one or more coverage enhancement requirements associated with a UE, a TRS indication that indicates a set of resources corresponding to a TRS; and means for transmitting the TRS, the TRS comprising a plurality of tones, wherein a transmission power for each tone of the plurality of tones is inversely proportional to a bandwidth difference between a bandwidth of the TRS and a reference bandwidth associated with the TRS.

In some aspects, the TRS indication indicates a plurality of periodic TRS instances, a number of the periodic TRS instances is based at least in part on the one or more coverage enhancement requirements associated with the UE.

In some aspects, the TRS indication is carried in a radio resource control message.

In some aspects, the TRS indication is carried in a dynamic transmission.

In some aspects, the dynamic transmission comprises at least one of: a UE-specific DCI transmission, a group-common DCI transmission, a UE-specific MAC-CE, or a group-common MAC-CE.

In some aspects, the TRS indication activates a configured TRS.

In some aspects, the configured TRS comprises one or more parameters corresponding to the TRS.

In some aspects, the apparatus includes means for transmitting an additional TRS indication, wherein the additional TRS indication comprises a dynamic indication of an additional set of resources associated with the TRS.

In some aspects, the additional TRS indication indicates an additional bandwidth corresponding to the additional set of resources.

In some aspects, the apparatus includes means for transmitting an indication of an expiry timer corresponding to the TRS.

In some aspects, the TRS indication indicates the expiry timer corresponding to the TRS.

In some aspects, the apparatus includes means for transmitting an additional TRS, wherein the additional TRS comprises the reference bandwidth based at least in part on a determination that the expiry timer is expired.

In some aspects, the indication of the expiry timer comprises a dynamic indication.

In some aspects, a method, device, apparatus, computer program product, non-transitory computer-readable medium, user equipment, base station, node, wireless communication device, and/or processing system as substantially described herein with reference to and as illustrated by the accompanying drawings and specification.

Aspects generally include a method, apparatus, system, computer program product, non-transitory computer-readable medium, user equipment, base station, wireless communication device, and/or processing system as substantially described herein with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
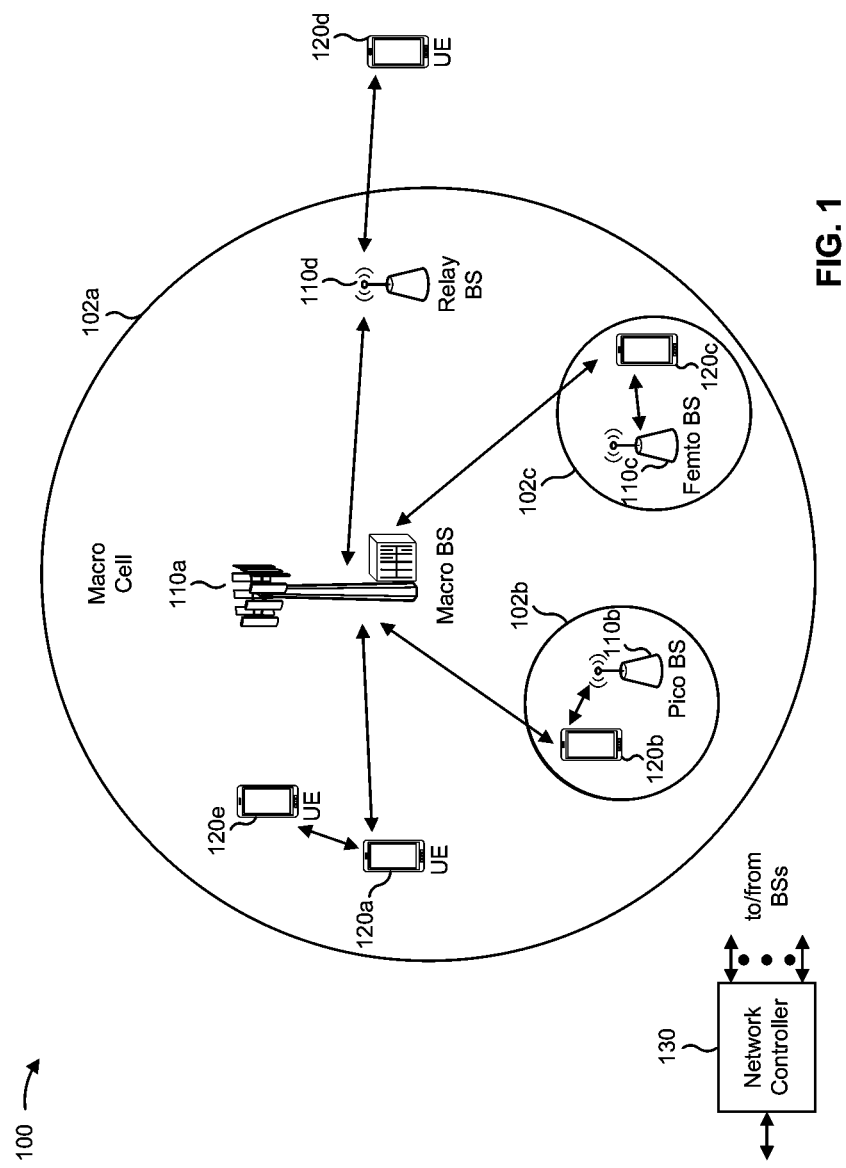
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
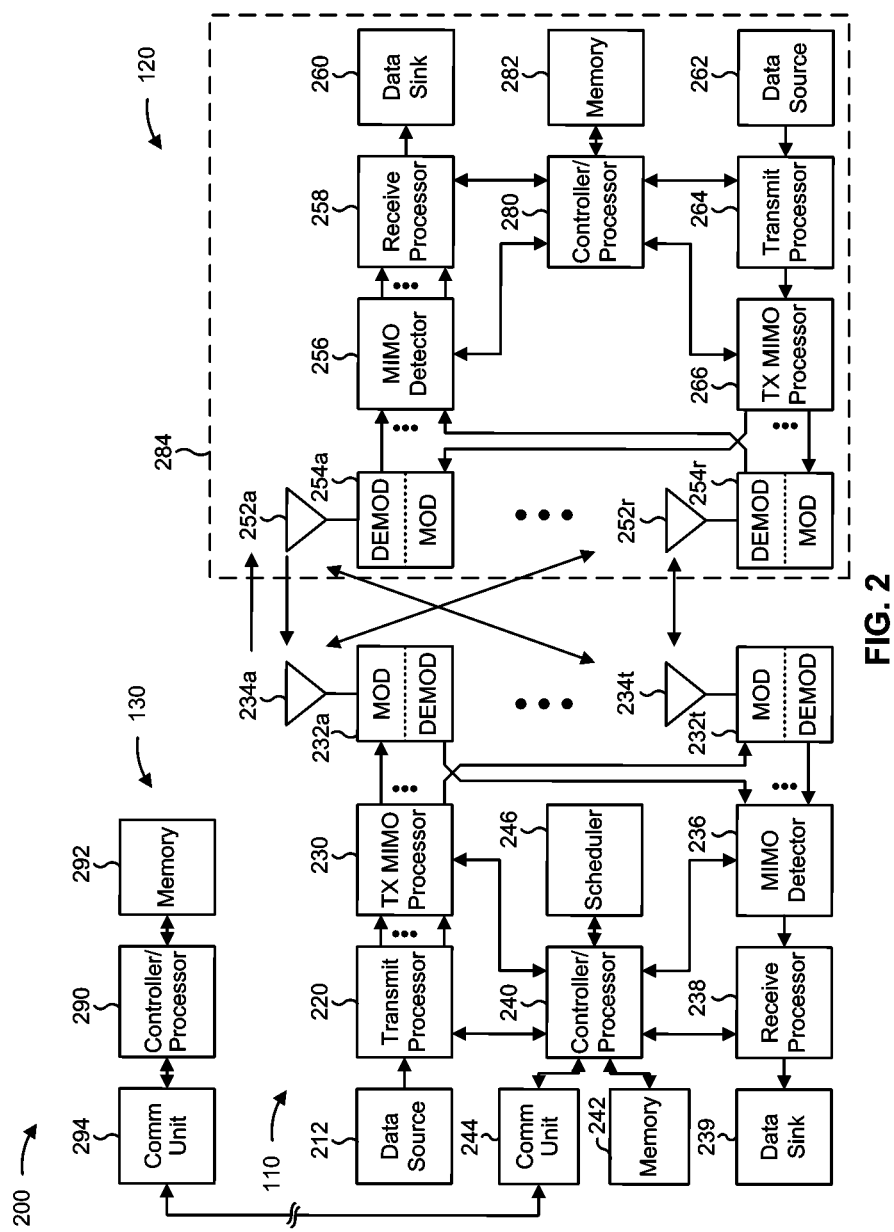
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with tracking reference signals (TRSs) with concentrated power per tone, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, interpreting the instructions, and/or the like.

In some aspects, UE 120 may include means for receiving, based at least in part on one or more coverage enhancement requirements associated with the UE, a tracking reference signal (TRS) indication that indicates a set of resources corresponding to a TRS, means for receiving the TRS, wherein the TRS includes a plurality of tones, wherein a transmission power for each tone of the plurality of tones is inversely proportional to a bandwidth difference between a bandwidth of the TRS and a reference bandwidth associated with the TRS, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, based at least in part on one or more coverage enhancement requirements associated with a UE, a TRS indication that indicates a set of resources corresponding to a TRS, means for transmitting the TRS, the TRS comprising a plurality of tones, wherein a transmission power for each tone of the plurality of tones is inversely proportional to a bandwidth difference between a bandwidth of the TRS and a reference bandwidth associated with the TRS, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A base station (e.g., base station 110) may transmit a tracking reference signal (TRS) to a UE. The TRS is a special application of a channel state information reference signal (CSI-RS) and may be used for frequency and time tracking. TRSs also may be used for channel delay spread estimation and Doppler spread estimation. In some cases, TRSs are wide-band and transmitted in regular bursts. The parameters for burst structures of TRSs may include TRS burst length in terms of number of slots and the TRS burst periodicity in terms of number of slots.

TRS can be configured as aperiodic and/or periodic. The periodic TRS includes resources with the same periodicity and bandwidth in each occurrence. When aperiodic TRS is also configured, it may be used to generate additional instances of the periodic TRS that can be triggered dynamically outside of the periodically occurring TRS occasions.

A TRS can be configured on a carrier, or on an active bandwidth part (BWP) when a synchronization signal block (SSB) is not present. In some cases, a TRS can be quasi co-located with a physical downlink shared channel (PDSCH) demodulation reference signal (DMRS), regarding least delay spread, average delay, Doppler shift, Doppler spread, and/or the like. In some cases, the TRS sequence is based on a pseudo-random generator. For a connected mode UE, the UE may receive a UE-specific radio resource control (RRC) configuration of a TRS.

TRS is configured as a CSI-RS resource set and, for UEs with insufficient coverage, the TRS resources may not have enough density to facilitate reliable frequency tracking, time tracking, estimation of channel delay spread, and/or estimation of Doppler spread, which may result in negative impacts to network performance.

Aspects of the techniques and apparatuses described herein may facilitate transmitting a TRS with a more concentrated power for each tone. In some aspects, a base station may transmit a TRS indication that indicates a set of resources corresponding to a TRS and may transmit the TRS, wherein a transmission power for each tone of the plurality of tones is inversely proportional to a bandwidth difference between a bandwidth of the TRS and a reference bandwidth associated with the TRS. The base station may transmit the TRS indication based at least in part on one or more coverage enhancement requirements associated with the UE. In this way, aspects may enable a TRS to be transmitted with a transmission power per tone that exceeds a reference power per tone (e.g., a power per tone that is specified as a standard or default power per tone in a wireless communication specification). Thus, aspects may facilitate more reliable frequency tracking, time tracking, estimation of channel delay spread, and/or estimation of Doppler spread. As a result, aspects may result in positive impacts to network performance.

Figure 3:
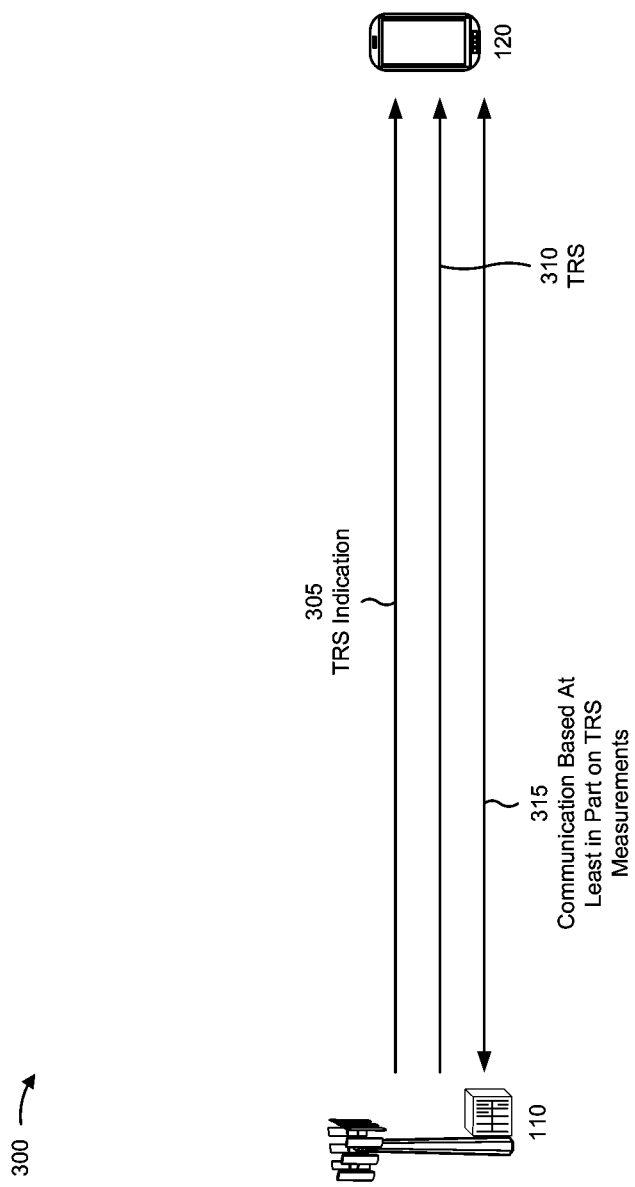
FIG. 3 is a diagram illustrating an example associated with tracking reference signals (TRSs) with concentrated power per tone, in accordance with various aspects of the present disclosure.

FIG. 3 is a diagram illustrating an example 300 associated with TRSs with concentrated power per tone, in accordance with various aspects of the present disclosure. As shown, a base station 110 and a UE 120 may communicate with one another. In some aspects, the base station 110 and the UE 120 may communicate with one another via a wireless network (e.g., wireless network 100 shown in FIG. 1).

As shown by reference number 305, the base station 110 may transmit, and the UE 120 may receive, a TRS indication. In some aspects, the TRS indication may indicate a set of resources corresponding to a TRS. The TRS indication may indicate a plurality of periodic TRS instances. A number of the periodic TRS instances may be based at least in part on the one or more coverage enhancement requirements associated with the UE.

In some aspects, the TRS indication may be carried in a radio resource control (RRC) message. In some aspects, the TRS indication may be carried in a dynamic transmission. The dynamic transmission may include at least one of: a UE-specific downlink control information (DCI) transmission, a group-common DCI transmission, a UE-specific medium access control (MAC)-control element (MAC-CE), or a group-common MAC-CE. In some aspects, the TRS indication activates a configured TRS. The configured TRS may include one or more parameters corresponding to the TRS.

In some aspects, the base station 110 may transmit, and a UE 120 may receive, an additional TRS indication. The additional TRS indication may include a dynamic indication of an additional set of resources associated with the TRS. The additional TRS indication may indicate an additional bandwidth corresponding to the additional set of resources.

In some aspects, the base station 110 may transmit, and the UE 120 may receive, an indication of an expiry timer corresponding to the TRS. In some aspects, the TRS indication may indicate the expiry timer corresponding to the TRS. In some aspects, the indication of the expiry timer may include a dynamic indication. In some aspects, the base station 110 may transmit, and the UE 120 may receive, an additional TRS based at least in part on the additional TRS indication. The additional TRS may include the reference bandwidth based at least in part on a determination that the expiry timer is expired.

As shown by reference number 310, the base station 110 may transmit, and the UE 120 may receive, a TRS based at least in part on the TRS indication. The TRS may include a plurality of tones, and a transmission power for each tone of the plurality of tones may be inversely proportional to a bandwidth difference between a bandwidth of the TRS and a reference bandwidth associated with the TRS. As shown by reference number 315, the base station 110 and the UE 120 may communicate based at least in part on one or more measurements associated with the TRS performed by the UE 120.

As indicated above, FIG. 3 is provided as an example. Other examples may differ from what is described with respect to FIG. 3.

Figure 4:
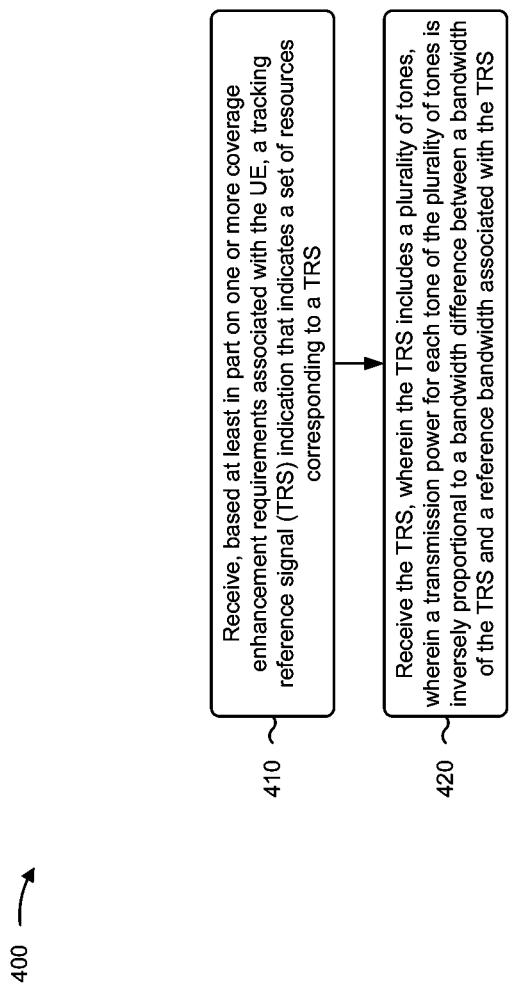
FIGS. 4 and 5 are diagrams illustrating example processes associated with TRSs with concentrated power per tone, in accordance with various aspects of the present disclosure.

FIG. 4 is a diagram illustrating an example process 400 performed, for example, by a UE, in accordance with various aspects of the present disclosure. Example process 400 is an example where the UE (e.g., UE 120) performs operations associated with techniques for TRSs with concentrated power per tone.

As shown in FIG. 4, in some aspects, process 400 may include receiving, based at least in part on one or more coverage enhancement requirements associated with the UE, a TRS indication that indicates a set of resources corresponding to a TRS (block 410). For example, the UE (e.g., using reception component 602, depicted in FIG. 6) may receive, based at least in part on one or more coverage enhancement requirements associated with the UE, a TRS indication that indicates a set of resources corresponding to a TRS, as described above.

As further shown in FIG. 4, in some aspects, process 400 may include receiving the TRS, wherein the TRS includes a plurality of tones, wherein a transmission power for each tone of the plurality of tones is inversely proportional to a bandwidth difference between a bandwidth of the TRS and a reference bandwidth associated with the TRS (block 420). For example, the UE (e.g., using reception component 602, depicted in FIG. 6) may receive the TRS, wherein the TRS includes a plurality of tones, wherein a transmission power for each tone of the plurality of tones is inversely proportional to a bandwidth difference between a bandwidth of the TRS and a reference bandwidth associated with the TRS, as described above.

Process 400 may include additional aspects, such as any single aspect or any combination of aspects described below and/or in connection with one or more other processes described elsewhere herein.

In a first aspect, the TRS indication indicates a plurality of periodic TRS instances, wherein a number of the periodic TRS instances is based at least in part on the one or more coverage enhancement requirements associated with the UE.

In a second aspect, alone or in combination with the first aspect, the TRS indication is carried in a radio resource control message.

In a third aspect, alone or in combination with the first aspect, the TRS indication is carried in a dynamic transmission.

In a fourth aspect, alone or in combination with the third aspect, the dynamic transmission comprises at least one of a UE-specific DCI transmission, a group-common DCI transmission, a UE-specific MAC-CE, or a group-common MAC-CE.

In a fifth aspect, alone or in combination with one or more of the first through fourth aspects, the TRS indication activates a configured TRS.

In a sixth aspect, alone or in combination with one or more of the first through fifth aspects, the configured TRS comprises one or more parameters corresponding to the TRS.

In a seventh aspect, alone or in combination with one or more of the first through sixth aspects, process 400 includes receiving an additional TRS indication, wherein the additional TRS indication comprises a dynamic indication of an additional set of resources associated with the TRS.

In an eighth aspect, alone or in combination with the seventh aspect, the additional TRS indication indicates an additional bandwidth corresponding to the additional set of resources.

In a ninth aspect, alone or in combination with one or more of the first through eighth aspects, process 400 includes receiving an indication of an expiry timer corresponding to the TRS.

In a tenth aspect, alone or in combination with the ninth aspect, the TRS indication indicates the expiry timer corresponding to the TRS.

In an eleventh aspect, alone or in combination with one or more of the ninth or tenth aspects, process 400 includes receiving an additional TRS, wherein the additional TRS comprises the reference bandwidth based at least in part on a determination that the expiry timer is expired.

In a twelfth aspect, alone or in combination with one or more of the ninth through eleventh aspects, the indication of the expiry timer comprises a dynamic indication.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
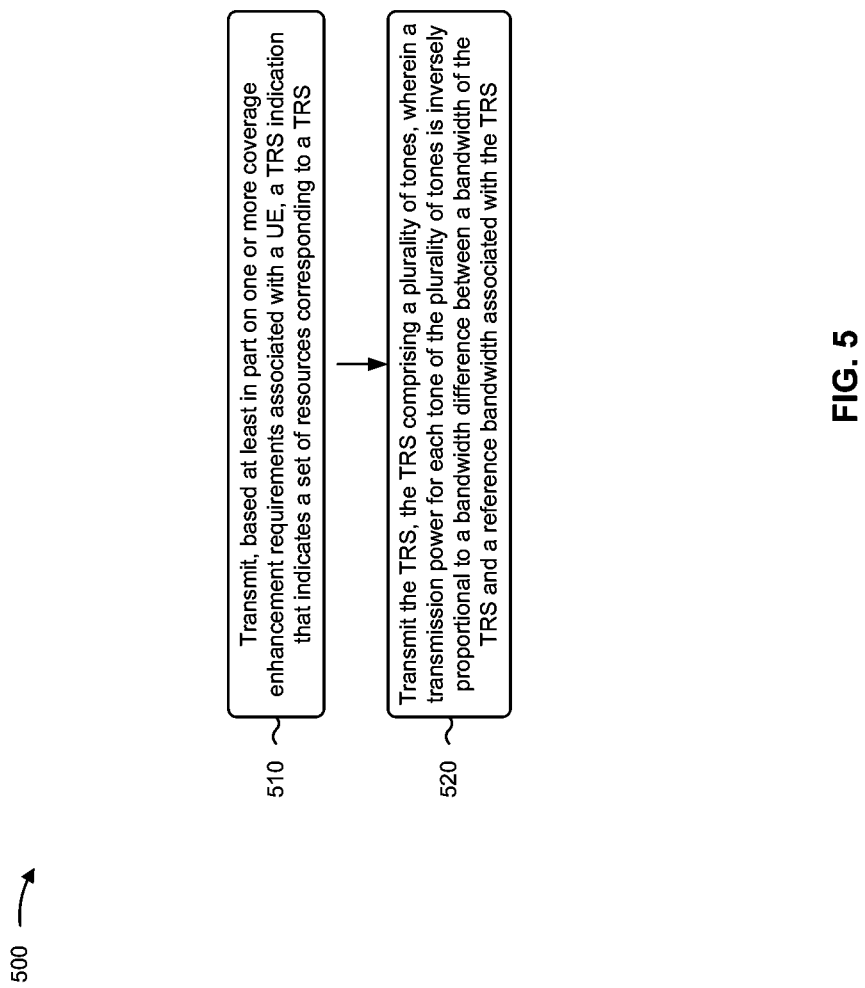

FIG. 5 is a diagram illustrating an example process 500 performed, for example, by a base station, in accordance with various aspects of the present disclosure. Example process 500 is an example where the base station (e.g., base station 110) performs operations associated with techniques for TRSs with concentrated power per tone.

As shown in FIG. 5, in some aspects, process 500 may include transmitting, based at least in part on one or more coverage enhancement requirements associated with a UE, a TRS indication that indicates a set of resources corresponding to a TRS (block 510). For example, the base station (e.g., using transmission component 704, depicted in FIG. 7) may transmit, based at least in part on one or more coverage enhancement requirements associated with a UE, a TRS indication that indicates a set of resources corresponding to a TRS, as described above.

As further shown in FIG. 5, in some aspects, process 500 may include transmitting the TRS, the TRS comprising a plurality of tones, wherein a transmission power for each tone of the plurality of tones is inversely proportional to a bandwidth difference between a bandwidth of the TRS and a reference bandwidth associated with the TRS (block 520). For example, the base station (e.g., using transmission component 704, depicted in FIG. 7) may transmit the TRS, the TRS comprising a plurality of tones, wherein a transmission power for each tone of the plurality of tones is inversely proportional to a bandwidth difference between a bandwidth of the TRS and a reference bandwidth associated with the TRS, as described above.

Process 500 may include additional aspects, such as any single aspect or any combination of aspects described below and/or in connection with one or more other processes described elsewhere herein.

In a first aspect, the TRS indication indicates a plurality of periodic TRS instances, wherein a number of the periodic TRS instances is based at least in part on the one or more coverage enhancement requirements associated with the UE.

In a second aspect, alone or in combination with the first aspect, the TRS indication is carried in a radio resource control message.

In a third aspect, alone or in combination with the first aspect, the TRS indication is carried in a dynamic transmission.

In a fourth aspect, alone or in combination with the third aspect, the dynamic transmission comprises at least one of a UE-specific DCI transmission, a group-common DCI transmission, a UE-specific MAC-CE, or a group-common MAC-CE.

In a fifth aspect, alone or in combination with one or more of the first through fourth aspects, the TRS indication activates a configured TRS.

In a sixth aspect, alone or in combination with one or more of the first through fifth aspects, the configured TRS comprises one or more parameters corresponding to the TRS.

In a seventh aspect, alone or in combination with one or more of the first through sixth aspects, process 500 includes transmitting an additional TRS indication, wherein the additional TRS indication comprises a dynamic indication of an additional set of resources associated with the TRS.

In an eighth aspect, alone or in combination with the seventh aspect, the additional TRS indication indicates an additional bandwidth corresponding to the additional set of resources.

In a ninth aspect, alone or in combination with one or more of the first through eighth aspects, process 500 includes transmitting an indication of an expiry timer corresponding to the TRS.

In a tenth aspect, alone or in combination with the ninth aspect, the TRS indication indicates the expiry timer corresponding to the TRS.

In an eleventh aspect, alone or in combination with one or more of the ninth or tenth aspects, process 500 includes transmitting an additional TRS, wherein the additional TRS comprises the reference bandwidth based at least in part on a determination that the expiry timer is expired.

In a twelfth aspect, alone or in combination with one or more of the ninth through eleventh aspects, the indication of the expiry timer comprises a dynamic indication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
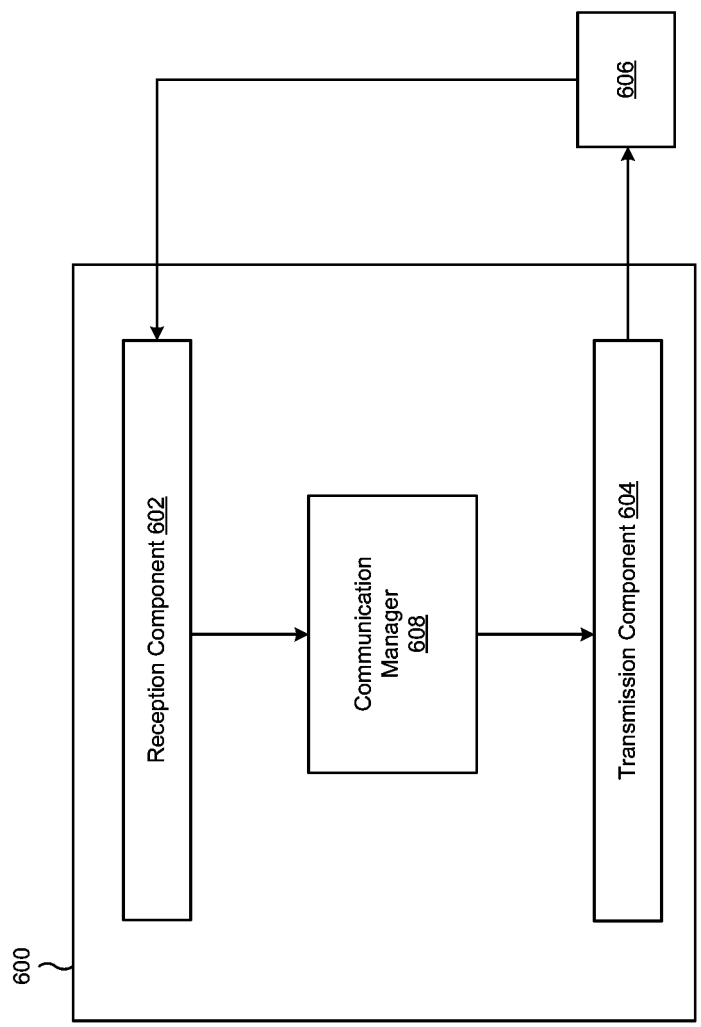
FIGS. 6 and 7 are block diagrams of example apparatuses for wireless communication, in accordance with various aspects of the present disclosure.

FIG. 6 is a block diagram of an example apparatus 600 for wireless communication. The apparatus 600 may be a UE, or a UE may include the apparatus 600. In some aspects, the apparatus 600 includes a reception component 602 and a transmission component 604, which may be in communication with one another (for example, via one or more buses and/or one or more other components). As shown, the apparatus 600 may communicate with another apparatus 606 (such as a UE, a base station, or another wireless communication device) using the reception component 602 and the transmission component 604. As further shown, the apparatus 600 may include a communication manager 608 that may measure TRSs, and/or perform management of communication tasks.

In some aspects, the apparatus 600 may be configured to perform one or more operations described herein in connection with FIG. 3. Additionally, or alternatively, the apparatus 600 may be configured to perform one or more processes described herein, such as process 400 of FIG. 4. In some aspects, the apparatus 600 and/or one or more components shown in FIG. 6 may include one or more components of the UE described above in connection with FIG. 2. Additionally, or alternatively, one or more components shown in FIG. 6 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 602 may receive communications, such as reference signals, control information, data communications, or a combination thereof, from the apparatus 606. The reception component 602 may provide received communications to one or more other components of the apparatus 600. In some aspects, the reception component 602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 606. In some aspects, the reception component 602 may include one or more antennas, a demodulator, a MIMO detector, a receive processor, a controller/processor, a memory, or a combination thereof, of the UE described above in connection with FIG. 2.

The transmission component 604 may transmit communications, such as reference signals, control information, data communications, or a combination thereof, to the apparatus 606. In some aspects, one or more other components of the apparatus 606 may generate communications and may provide the generated communications to the transmission component 604 for transmission to the apparatus 606. In some aspects, the transmission component 604 may perform signal processing on the generated communications (such as filtering, amplification, modulation, digital-to-analog conversion, multiplexing, interleaving, mapping, or encoding, among other examples), and may transmit the processed signals to the apparatus 606. In some aspects, the transmission component 604 may include one or more antennas, a modulator, a transmit MIMO processor, a transmit processor, a controller/processor, a memory, or a combination thereof, of the UE described above in connection with FIG. 2. In some aspects, the transmission component 604 may be collocated with the reception component 602 in a transceiver.

The reception component 602 may receive, based at least in part on one or more coverage enhancement requirements associated with the UE, a TRS indication that indicates a set of resources corresponding to a TRS. The reception component 602 may receive the TRS, wherein the TRS includes a plurality of tones, wherein a transmission power for each tone of the plurality of tones is inversely proportional to a bandwidth difference between a bandwidth of the TRS and a reference bandwidth associated with the TRS.

The reception component 602 may receive an additional TRS indication, wherein the additional TRS indication comprises a dynamic indication of an additional set of resources associated with the TRS. The reception component 602 may receive an indication of an expiry timer corresponding to the TRS. The reception component 602 may receive an additional TRS, wherein the additional TRS comprises the reference bandwidth based at least in part on a determination that the expiry timer is expired.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of (one or more) components shown in FIG. 6 may perform one or more functions described as being performed by another set of components shown in FIG. 6.

Figure 7:
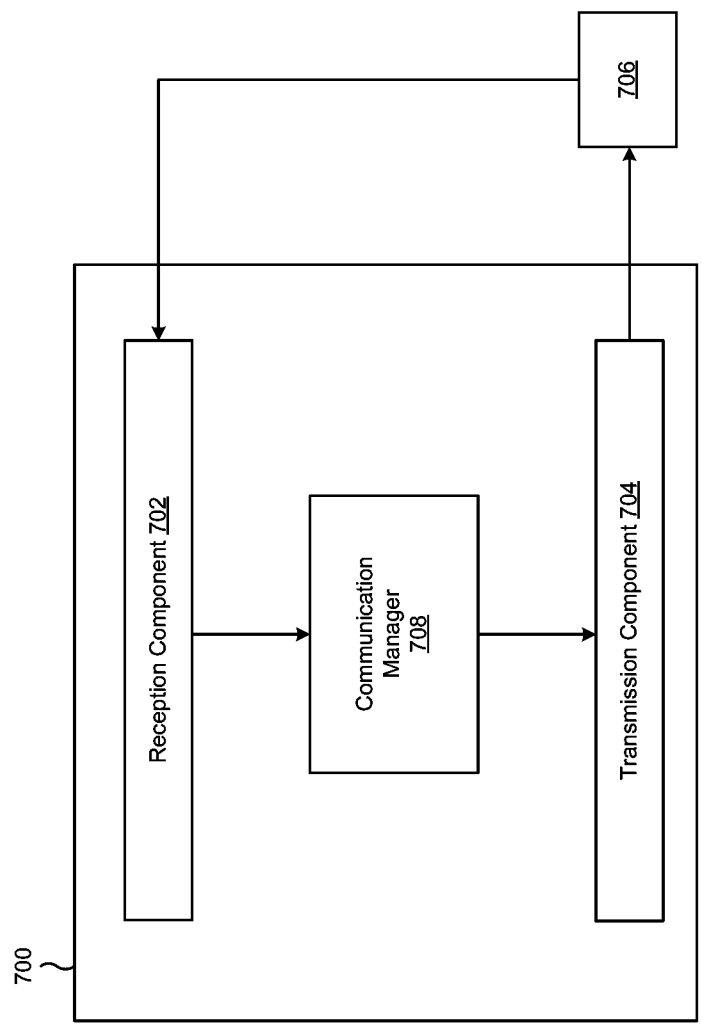

FIG. 7 is a block diagram of an example apparatus 700 for wireless communication. The apparatus 700 may be a base station, or a base station may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a communication manager 708 that may perform any number of management tasks associated with the apparatus 700.

In some aspects, the apparatus 700 may be configured to perform one or more operations described herein in connection with FIG. 3. Additionally, or alternatively, the apparatus 700 may be configured to perform one or more processes described herein, such as process 500 of FIG. 5. In some aspects, the apparatus 700 and/or one or more components shown in FIG. 7 may include one or more components of the base station described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the base station described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the base station described above in connection with FIG. 2. In some aspects, the transmission component 704 may be collocated with the reception component 702 in a transceiver.

The transmission component 704 may transmit, based at least in part on one or more coverage enhancement requirements associated with a UE, a TRS indication that indicates a set of resources corresponding to a TRS. The transmission component 704 may transmit the TRS, the TRS comprising a plurality of tones, wherein a transmission power for each tone of the plurality of tones is inversely proportional to a bandwidth difference between a bandwidth of the TRS and a reference bandwidth associated with the TRS.

The transmission component 704 may transmit an additional TRS indication, wherein the additional TRS indication comprises a dynamic indication of an additional set of resources associated with the TRS. The transmission component 704 may transmit an indication of an expiry timer corresponding to the TRS. The transmission component 704 may transmit an additional TRS, wherein the additional TRS comprises the reference bandwidth based at least in part on a determination that the expiry timer is expired.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, based at least in part on one or more coverage enhancement requirements associated with the UE, a tracking reference signal (TRS) indication that indicates a set of resources corresponding to a TRS; and
   receiving the TRS, wherein the TRS includes a plurality of tones, wherein a transmission power for each tone of the plurality of tones is inversely proportional to a bandwidth difference between a bandwidth of the TRS and a reference bandwidth associated with the TRS.

2. The method of claim 1, wherein the TRS indication indicates a plurality of periodic TRS instances, wherein a number of the periodic TRS instances is based at least in part on the one or more coverage enhancement requirements associated with the UE.

3. The method of claim 1, wherein the TRS indication is carried in at least one of:
   a UE-specific downlink control information (DCI) transmission,
   a group-common DCI transmission,
   a UE-specific medium access control (MAC)-control element (MAC-CE), or
   a group-common MAC-CE.

4. The method of claim 1, wherein the TRS indication activates a configured TRS, wherein the configured TRS comprises one or more parameters corresponding to the TRS.

5. The method of claim 1, further comprising receiving an additional TRS indication, wherein the additional TRS indication comprises a dynamic indication of an additional set of resources associated with the TRS.

6. The method of claim 5, wherein the additional TRS indication indicates an additional bandwidth corresponding to the additional set of resources.

7. The method of claim 1, further comprising receiving an indication of an expiry timer corresponding to the TRS.

8. The method of claim 7, further comprising receiving an additional TRS, wherein the additional TRS comprises the reference bandwidth based at least in part on a determination that the expiry timer is expired.

9. A method of wireless communication performed by a base station, comprising:
   transmitting, based at least in part on one or more coverage enhancement requirements associated with a user equipment (UE), a tracking reference signal (TRS) indication that indicates a set of resources corresponding to a TRS; and
   transmitting the TRS, the TRS comprising a plurality of tones, wherein a transmission power for each tone of the plurality of tones is inversely proportional to a bandwidth difference between a bandwidth of the TRS and a reference bandwidth associated with the TRS.

10. The method of claim 9, wherein the TRS indication indicates a plurality of periodic TRS instances, wherein a number of the periodic TRS instances is based at least in part on the one or more coverage enhancement requirements associated with the UE.

11. The method of claim 9, wherein the TRS indication is carried in at least one of:
    a UE-specific downlink control information (DCI) transmission,
    a group-common DCI transmission,
    a UE-specific medium access control (MAC)-control element (MAC-CE), or
    a group-common MAC-CE.

12. The method of claim 9, wherein the TRS indication activates a configured TRS, wherein the configured TRS comprises one or more parameters corresponding to the TRS.

13. The method of claim 9, further comprising transmitting an additional TRS indication, wherein the additional TRS indication comprises a dynamic indication of an additional set of resources associated with the TRS, wherein the additional TRS indication indicates an additional bandwidth corresponding to the additional set of resources.

14. The method of claim 9, further comprising transmitting an indication of an expiry timer corresponding to the TRS.

15. The method of claim 14, further comprising transmitting an additional TRS, wherein the additional TRS comprises the reference bandwidth based at least in part on a determination that the expiry timer is expired.

16. A user equipment (UE) for wireless communication, comprising:
   a memory; and
   one or more processors operatively coupled to the memory, the memory and the one or more processors configured to:
      receive, based at least in part on one or more coverage enhancement requirements associated with the UE, a tracking reference signal (TRS) indication that indicates a set of resources corresponding to a TRS; and
      receive the TRS, wherein the TRS includes a plurality of tones, wherein a transmission power for each tone of the plurality of tones is inversely proportional to a bandwidth difference between a bandwidth of the TRS and a reference bandwidth associated with the TRS.

17. The UE of claim 16, wherein the TRS indication indicates a plurality of periodic TRS instances, wherein a number of the periodic TRS instances is based at least in part on the one or more coverage enhancement requirements associated with the UE.

18. The UE of claim 16, wherein the TRS indication is carried in at least one of:
   a UE-specific downlink control information (DCI) transmission,
   a group-common DCI transmission,
   a UE-specific medium access control (MAC)-control element (MAC-CE), or
   a group-common MAC-CE.

19. The UE of claim 16, wherein the TRS indication activates a configured TRS, wherein the configured TRS comprises one or more parameters corresponding to the TRS.

20. The UE of claim 16, wherein the one or more processors are further configured to receive an additional TRS indication, wherein the additional TRS indication comprises a dynamic indication of an additional set of resources associated with the TRS.

21. The UE of claim 20, wherein the additional TRS indication indicates an additional bandwidth corresponding to the additional set of resources.

22. The UE of claim 16, wherein the one or more processors are further configured to receive an indication of an expiry timer corresponding to the TRS.

23. The UE of claim 22, wherein the one or more processors are further configured to receive an additional TRS, wherein the additional TRS comprises the reference bandwidth based at least in part on a determination that the expiry timer is expired.

24. A base station for wireless communication, comprising:
   a memory; and
   one or more processors operatively coupled to the memory, the memory and the one or more processors configured to:
      transmit, based at least in part on one or more coverage enhancement requirements associated with a user equipment (UE), a tracking reference signal (TRS) indication that indicates a set of resources corresponding to a TRS; and
      transmit the TRS, the TRS comprising a plurality of tones, wherein a transmission power for each tone of the plurality of tones is inversely proportional to a bandwidth difference between a bandwidth of the TRS and a reference bandwidth associated with the TRS.

25. The base station of claim 24, wherein the TRS indication indicates a plurality of periodic TRS instances, wherein a number of the periodic TRS instances is based at least in part on the one or more coverage enhancement requirements associated with the UE.

26. The base station of claim 24, wherein the TRS indication is carried in at least one of:
   a UE-specific downlink control information (DCI) transmission,
   a group-common DCI transmission,
   a UE-specific medium access control (MAC)-control element (MAC-CE), or
   a group-common MAC-CE.

27. The base station of claim 24, wherein the TRS indication activates a configured TRS, wherein the configured TRS comprises one or more parameters corresponding to the TRS.

28. The base station of claim 24, wherein the one or more processors are further configured to transmit an additional TRS indication, wherein the additional TRS indication comprises a dynamic indication of an additional set of resources associated with the TRS, wherein the additional TRS indication indicates an additional bandwidth corresponding to the additional set of resources.

29. The base station of claim 24, wherein the one or more processors are further configured to transmit an indication of an expiry timer corresponding to the TRS.

30. The base station of claim 29, wherein the one or more processors are further configured to transmit an additional TRS, wherein the additional TRS comprises the reference bandwidth based at least in part on a determination that the expiry timer is expired.

* * * * *